United States Patent
Zaugg

(10) Patent No.: US 8,523,188 B2
(45) Date of Patent: Sep. 3, 2013

(54) CENTERED FLOATING SEAL

(75) Inventor: Brian Zaugg, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 431 days.

(21) Appl. No.: 12/912,088

(22) Filed: Oct. 26, 2010

(65) Prior Publication Data

US 2011/0095487 A1   Apr. 28, 2011

Related U.S. Application Data

(60) Provisional application No. 61/255,236, filed on Oct. 27, 2009.

(51) Int. Cl.
  *F16J 15/44* (2006.01)
  *F16J 15/00* (2006.01)
(52) U.S. Cl.
  USPC .......................... 277/422; 277/579; 277/580
(58) Field of Classification Search
  USPC ......... 277/438–439, 447–448, 422, 503–505, 277/508–509, 579–580
  See application file for complete search history.

(56) References Cited

U.S. PATENT DOCUMENTS

| | | | | |
|---|---|---|---|---|
| 452,900 | A | * | 5/1891 | Wheelock ..................... 277/482 |
| 2,311,559 | A | * | 2/1943 | Mason ........................... 277/484 |
| 3,518,020 | A | * | 6/1970 | Lake .............................. 415/111 |
| 4,888,244 | A | * | 12/1989 | Masubuchi et al. ............ 428/416 |
| 5,039,139 | A | * | 8/1991 | McElroy et al. ............... 285/319 |
| 6,257,588 | B1 | | 7/2001 | Bagepalli et al. |
| 7,992,694 | B2 | * | 8/2011 | Krause et al. ................. 192/3.29 |

* cited by examiner

*Primary Examiner* — Vishal Patel
(74) *Attorney, Agent, or Firm* — Simpson & Simpson, PLLC

(57) ABSTRACT

A self-centering floating seal comprising a ring having first and second diameters, wherein the ring is arranged to be installed between first and second gland components, a plurality of tabs protruding from the first diameter, wherein the tabs are operatively arranged to exert a force on the first gland component to create a radial gap between the first diameter and the first gland component, while the second diameter is arranged to engage against the second gland component for forming a sealed interface, a plurality of seats corresponding to the plurality of tabs, wherein each seat forms a recess in the first diameter of the ring for receiving one of the tabs when each tab is flexed toward the ring, and wherein the tabs are substantially equally spaced about the first diameter of the ring, and each of the tabs spans an axial thickness of the ring.

12 Claims, 4 Drawing Sheets

CENTERED FLOATING SEAL

CROSS-REFERENCE TO RELATED APPLICATIONS

This application claims the benefit under 35 U.S.C. §119 (e) of U.S. Provisional Application No. 61/255,236, filed Oct. 27, 2009.

FIELD OF THE INVENTION

The invention broadly relates to sealing mechanisms, more specifically to a centered floating seal, and even more particularly to a centered floating seal for use in an automobile torque converter or power transmission.

BACKGROUND OF THE INVENTION

Sealing means are well known in the art. Examples of conventional seals include, for example, floating seals, compression rings, or spring loaded seals. Floating seals do not offer any type of centering during an assembly process. As a result, these seals often fall or sag radially until the inner diameter of the seal contacts the minor diameter of a seal gland, which can result in assembly issues or failure of the seal.

Compression seals do not offer a large degree of radial freedom between adjacent parts, and therefore can not be used to seal fully dynamic interfaces. Spring loaded seals do offer some degree of centering and radial compliance, but are costly to manufacture, and therefore not suitable for many applications.

Due to low cost of manufacture and good performance in fully dynamic interfaces, floating seals are a commonly preferred means of creating a sealed interface between two independently moveable components. However, because of the lack of the ability to self-center during assembly, these seals can often become damaged, torn, or broken during the assembly process. Specifically, a sizing tool may be used to compress the seal to a diameter smaller than the major diameter of the gland in which the seal is installed. However, when the tool is removed so that the seal can be installed between the two independently moveable components, the seal is no longer supported and can fall due to gravity so that the outer diameter of the seal drops below the major diameter of the gland, which may result in the seal being pinched when the two independently moveable components are engaged together.

Such a scenario is illustrated in FIG. 7, where floating seal 110 is being installed in groove 132 of hub 130 of a torque converter (not shown), to provide a sealed fully dynamic interface between the hub and piston plate 140. It should be appreciated that the hub and piston plate are shown for illustrative purposes only, and could be replaced by any two components which must be sealed, but which also must be independently moveable. By independently moveable we mean in any direction, including axially, radially, and rotatably.

For clarity, floating seal 110 is designated with reference numerals 110a and 110b to differentiate the top and bottom portions of the seal, but it should be understood that the seal is a single, integrated ring. Likewise, groove 132 is designated with reference numerals 132a and 132b to differentiate the top and bottom portions of the groove, but it should be understood that the groove is continuous about the periphery of the hub. Outer hub diameter or surface 134 and inner piston plate surface or diameter 144 are similarly designated with the identifiers "a" and "b" to differentiate their respective top and bottom portions, despite both being continuous surfaces about their respective components.

Piston plate 140 is generally a ring shaped plate which includes center bore 142 in which hub 130 is installed. When vertically orientated, as shown, floating seal 110 will fall or sag, so that the inner diameter of the seal rests at the base of groove top portion 132a, but so that a large gap is created, having a radial distance $x_2$, between the base of groove bottom portion 132b and the inner diameter of the seal. As hub 130 is pressed into bore 142 of piston plate 140 in the direction of arrow 150, (or the piston plate in a direction opposite to the direction shown), surface bottom portions 134b and 144b of the hub and plate, respectively, will likely pinch or cut off a portion of the seal. The portion of the seal which is exposed to the inner diameter of the piston plate is the portion shown below the dashed line, which indicates the intended path of surface bottom diameter 144b of the piston plate. Alternatively stated, the radial falling of floating seal 110 results in a portion of the seal residing outside of bore 142, so that the seal will get pinched between the hub and piston plate when these two components are engaged. Surface top portions 134a and 144a of the hub and plate, however, will not damage seal top portion 110a, but will instead merely pass over, or slightly compress the ring into the groove, as desired.

After installation of the hub with the piston plate, visual inspection of seal 110 becomes impossible, since the seal is sandwiched between the two components. Thus, failure of the seal can only be determined by fully assembling and testing the torque converter, for example. In such a scenario, something as seemingly insignificant as a seal will become very costly and difficult to replace. Specifically, in the shown example of hub and piston plate of a torque converter, the torque converter must be largely disassembled and then reassembled. Some components are installed in the torque converter so that the components must be cut in order to complete disassembly. This not only ruins the cut components so that they need to be replaced with new parts, but creates shavings and debris from the cutting process, which requires the torque converter to be completely washed and cleaned to ensure no debris interferes with the performance of the torque converter. Only then, can the defective seal be replaced, and the hub, piston, and other components reassembled. A similar situation could occur in any assembly requiring a floating seal between two dynamic components.

Thus, there is a long-felt need for a floating seal which can center itself so that it is not likely to become damaged during assembly due to radial falling.

BRIEF SUMMARY OF THE INVENTION

The present invention broadly comprises a self-centering floating seal including a substantially annular ring having a first diameter and a second diameter, wherein the ring is operatively arranged to be installed between first and second gland components, and a tab protruding from the first diameter of the ring, wherein during assembly of the first gland component with the second gland component, the tab is operatively arranged to create a radial gap between the first diameter of the ring and the first gland component, while the second diameter of the ring is operatively arranged to engage against the second gland component for creating a sealed interface. In one embodiment, the first diameter is an inner diameter of the ring and the second diameter is an outer diameter of the ring. In one embodiment, the first diameter is an outer diameter of the ring and the second diameter is an inner diameter of the ring.

In one embodiment, the self-centering floating seal further comprises a seat, wherein the seat is adjacent to the tab, wherein the seat is operatively arranged as a recess in the first diameter of the ring for receiving the tab. In one embodiment, the seat has a first shape, the tab has a second shape, and the first and second shapes are complimentary. In one embodiment, the self-centering floating seal further comprises a notch in the ring, wherein the notch is located proximate an intersection of the tab with the ring, wherein the notch is operatively arranged to facilitate flexing of the tab. In one embodiment the floating seal comprises a plurality of tabs, wherein the tab is one tab in the plurality of tabs. In one embodiment, the plurality of tabs comprises exactly four tabs, wherein the exactly four tabs are equally spaced about the first diameter of the ring and arranged in oppositely disposed pairs. In one embodiment, the tab spans an axial thickness of the ring.

The current invention also broadly comprises a sealed fully dynamic interface including an inner gland component, an outer gland component, and a self-centering floating seal according to claim 1, wherein the self-centering floating seal is installed in a groove between the inner and outer gland components. In one embodiment, the inner gland component comprises the groove about an outer diameter of the inner gland component, the first diameter is an inner diameter of the ring, and the second diameter is an outer diameter of the ring, and wherein the tab is operatively arranged to engage against the inner gland component for creating the radial gap between the first diameter of the ring and the inner gland component, and wherein the second surface of the ring is operatively arranged to engage against the outer gland component for forming the sealed interface.

In one embodiment, the outer gland component comprises the groove about an inner diameter of the outer gland component, the first diameter is an outer diameter of the ring, and the second diameter is an inner diameter of the ring, and wherein the tab is operatively arranged to engage against the outer gland component for creating the radial gap between the first surface of the ring and the outer gland component, and wherein the second diameter of the ring is operatively arranged to engage against the inner gland component for forming the sealed interface. In one embodiment, the outer gland component is a piston plate and the inner gland component is a turbine hub. In one embodiment, the self-centering floating seal further comprises a seat, wherein the seat is adjacent to the tab, wherein the seat is operatively arranged as a recess in the first diameter of the ring for receiving the tab. In one embodiment, the seat has a first shape and the tab has a second shape, and wherein the first and second shapes are complimentary. In one embodiment, the self-centering floating seal further comprises a notch in the ring, wherein the notch is located proximate an intersection of the tab with the ring, and, wherein the notch is operatively arranged to facilitate flexing of the tab. In one embodiment, the sealed fully dynamic interface comprises exactly four tabs, wherein the tab is one of the exactly four tabs, wherein the exactly four tabs are equally spaced about the first diameter of the ring and arranged in oppositely disposed pairs. In one embodiment, the tab of the self-centering floating seal spans an axial thickness of the ring.

The current invention also broadly comprises a self-centering floating seal including a substantially annular ring having a first diameter and a second diameter, wherein the ring is operatively arranged to be installed between a first gland component and a second gland component, a plurality of tabs protruding from the first diameter of the ring, wherein during assembly of the first gland component with the second gland component, the tabs are operatively arranged to exert a force on the first gland component to create a radial gap between the first diameter of the ring and the first gland component, while the second diameter is operatively arranged to engage against the second gland component for forming a sealed interface, a plurality of seats corresponding to the plurality of tabs, wherein each seat forms a recess in the first diameter of the ring for receiving one of the tabs when each tab is flexed toward the ring, and wherein the tabs are substantially equally spaced about the first diameter of the ring, and each of the tabs spans an axial thickness of the ring. In one embodiment, the plurality of tabs comprises exactly four tabs equally spaced about the first diameter of the ring and arranged in oppositely disposed pairs.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. The terms "diameter" may be used interchangeably with "surface" to refer to the particular surface defined at a specific diameter. For example, a ring is defined by inner and outer diameters, and the term "inner diameter" may refer to the entire inner surface, while "outer diameter" may refer to the entire outer surface. Although any methods, devices or materials similar or equivalent to those described herein can be used in the practice or testing of the invention, the preferred methods, devices, and materials are now described.

Figure 1:
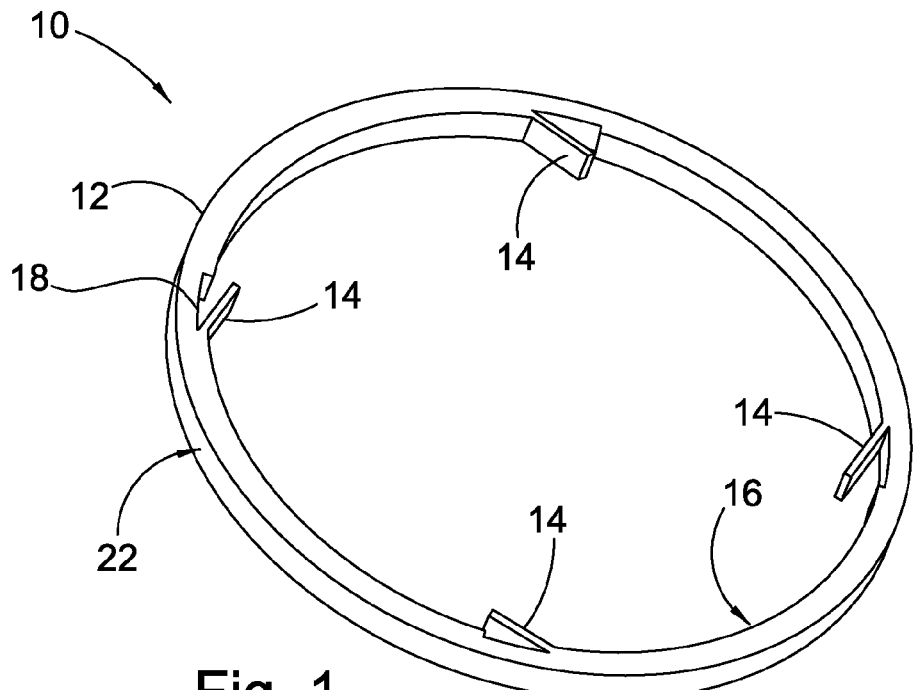
FIG. 1 is a perspective view of a centered floating seal according to the current invention.
Figure 2:
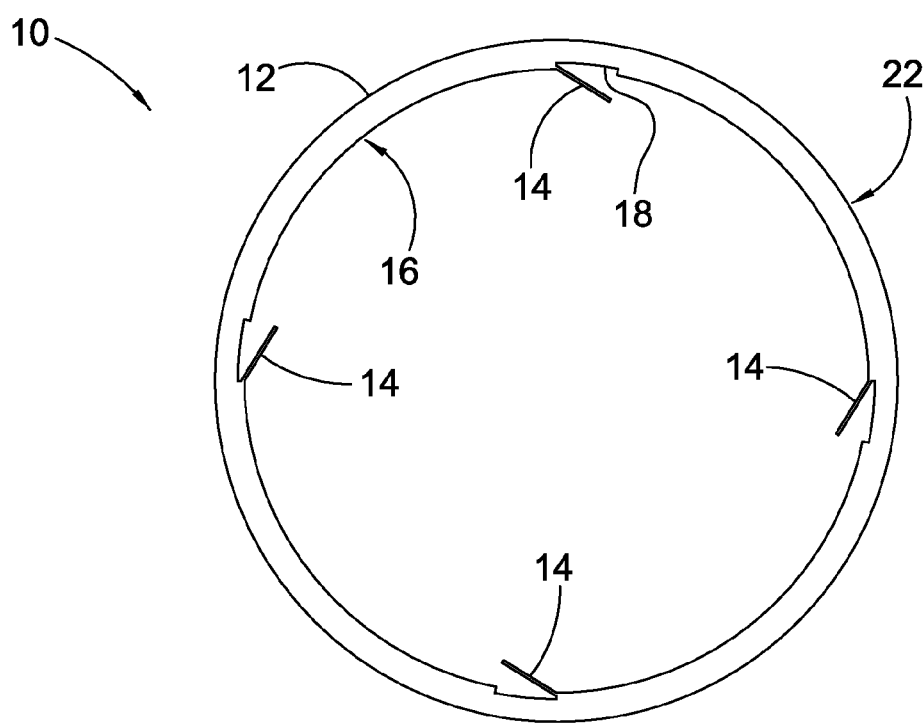
FIG. 2 is a front view of the centered floating seal shown in FIG. 1.
Figure 3:
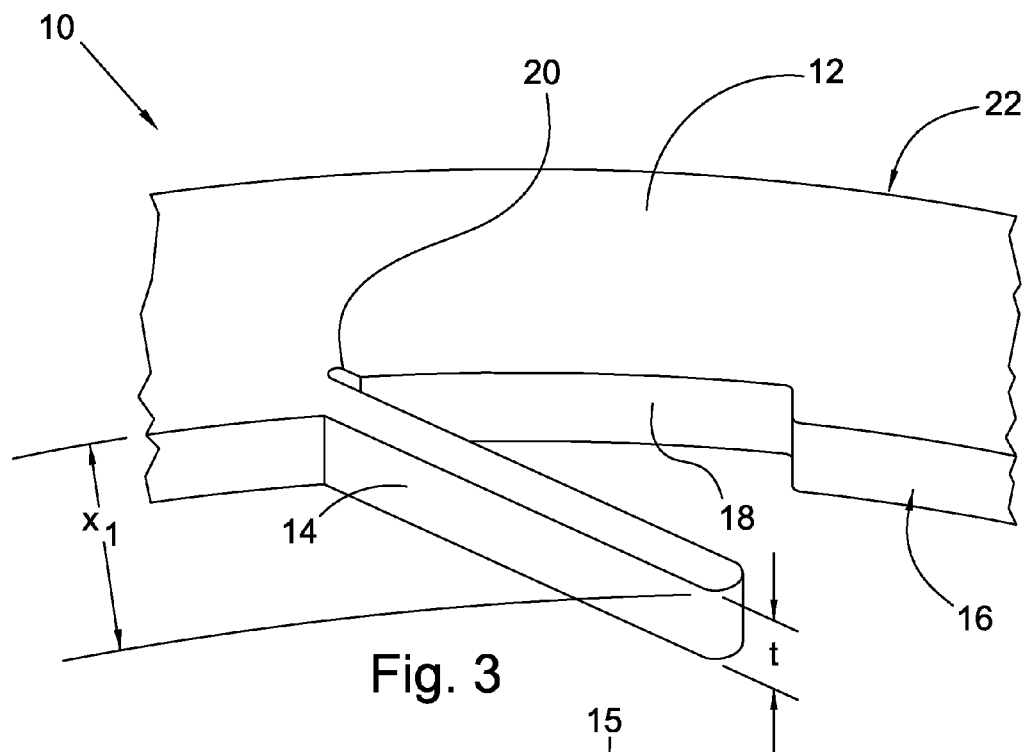
FIG. 3 is an enlarged perspective view of a tab of the centered floating seal shown in FIG. 1.

Referring now to the drawings, FIGS. 1-3 illustrate centered floating seal 10. Seal 10 is installable into a gland to create a sealed fully dynamic interface between two independently moveable components. Seal 10 includes substantially annular ring 12 and a plurality of tabs 14 about inner diameter 16 of the ring. In the shown embodiment, the seal includes seats 18 which are recessed from the inner diameter of the ring of the seal. As shown in FIG. 3, notches 20 may also be included adjacent the intersections of each tab 14 with ring 12. Outer diameter 22 of the ring would contact the inner diameter of the outer gland component, such as a piston plate in which a hub is installed, to provide a fluid tight fully dynamic seal between the two independently moveable components.

Tabs 14 enable seal 10 to self-center when installed in a gland between two independently moveable components. For simplicity, the independently moveable components will be referred to as inner and outer gland components, and the seal will be described as being installed in a groove located about the outer diameter of the inner gland component, although other embodiments may be suitable. Tabs 14 would provide self-centering against the inner gland component, while outer diameter 22 would act as a sealing surface with the outer gland component.

In one embodiment, the tabs are resilient enough that the tabs exert a sufficient load on the inner gland component to create a consistent radial gap between the ring and the inner gland component. In the shown embodiment, tabs 14 provide a radial gap of distance $x_1$. It should be commonly understood that by radial, it is meant along a line originating from, or passing though, the center of ring 12. Advantageously, seal 10 would not fall or sag when arranged on the inner gland component, as the tabs would ensure the self-centering of the seal.

In one embodiment the tabs are flexible so that they can bend or flex towards ring 12 when subjected to compression when the gland components are moving. This flexibility enables the seals to "float," as required by traditional floating seals. Thus, the tabs would center the seal during assembly, but would advantageously allow the floating necessary for seal 10 to operate effectively at a fully dynamic interface between two gland components.

It may be particularly advantageous in one embodiment to also include seats 18. Seats 18 are formed as recesses about ring 12, which interrupt inner diameter 16 of the ring. A seat is paired with each tab, and each seat is located adjacent to that seat's corresponding tab. Seats 18 should be shaped to be complimentary the shape of the tabs. By complimentary, what is meant is when the tabs are bent back into the seats 18, against the ring, the tabs will fill the recesses formed by seats 18 in inner diameter 16, so that inner diameter becomes substantially consistent and uninterrupted throughout. The seats may be of particular importance during assembly of the seal into a groove between inner and outer gland components. When installed on an inner gland component, the seal must be stretched over the inner gland component before it can fall into the groove. While stretching, the seats advantageously provide a place for the tabs to rest, so that the tabs do not get caught on the inner gland component and inadvertently torn off during the stretching process. Likewise, the seal is compressed by a sizing tool when installed into a groove in an outer gland component, and the seats provide a place for the tabs to rest during the compression, so that the tabs are not crushed or damaged. To facilitate the bending of the tabs into the seats, the tabs are preferably protruding from the ring at a relatively small or acute angle, as shown, so that the tabs can easily compress against the ring, and so that the tabs will not readily fold backwards on themselves. Tabs which are oriented at angles approaching ninety degrees with respect to inner diameter may have a tendency to "catch" on the inner or outer gland component during assembly or movement of the components, and fold or bend backward, which could damage or undesirably affect the performance of the seal.

In the shown embodiment, tabs 14 and seats 18 span the entire axial thickness of the ring, represented by distance t. By spanning the entire axial thickness, the tabs provide more balanced and even loading on the inner gland component to better support and center the seal.

Notches 20 are also included in the shown embodiment. The bending of tabs 14 back into seats 18, is likely to cause high stresses and deformation due to the compression and shifting of material about the point or axis of bending. Notches 20 are thus provided to prevent these stresses and reduce fatigue, by enabling that the material proximate the intersection of each tab and the ring to flex and shift during bending of the tabs, without crumpling or other permanent deformation.

In one embodiment, exactly three or four tabs are included, equally spaced about the inner diameter of the ring of the seal. Three equally spaced tabs would be the minimum number of contact points with the inner gland component to have the seal balanced on the inner gland component regardless of orientation. However, due to the large gap between each pair of adjacent tabs, some amount of sagging or dropping may still occur depending on the exact orientation, sizing, and material properties of the seal. Advantageously, four equally spaced tabs provides even better balancing because the forces exerted by the tabs would be directed to the inner gland component in oppositely disposed pairs, resulting in even further reduced sagging, and a greater assurance of a consistent radial gap, regardless of orientation of the seal on the gland component.

A greater number of tabs could be used in alternate embodiments, however, the reduction of falling or sagging would probably not be very significant unless the seal was either particularly large or overly flexible. Also, additional tabs would increase the total load exerted by the tabs on the inner gland component, which may detract from the seal's ability to "float," and therefore the performance of the seal. Fewer tabs could be used in alternate embodiments, but in such embodiments, certain orientations of the seal may still allow the seal to fall or sag, and may not provide a substantially consistent radial gap about the ring. In summation, the optimal number of tabs for each particular seal is the result of a balancing between floating characteristics and centering capabilities, where fewer tabs are desired for better floating characteristics of the seal, but more tabs are desired for improved self-centering capability. In general, larger or more flexible seals may benefit by including more tabs to provide additional support, while smaller or stiffer seals may operate sufficiently with a fewer number of tabs. For most anticipated constructions of centered floating seal 10, four tabs, as shown, will probably provide the best results, but more or less tabs may be desired depending on the physical properties of each particular seal, as discussed.

Figure 4:
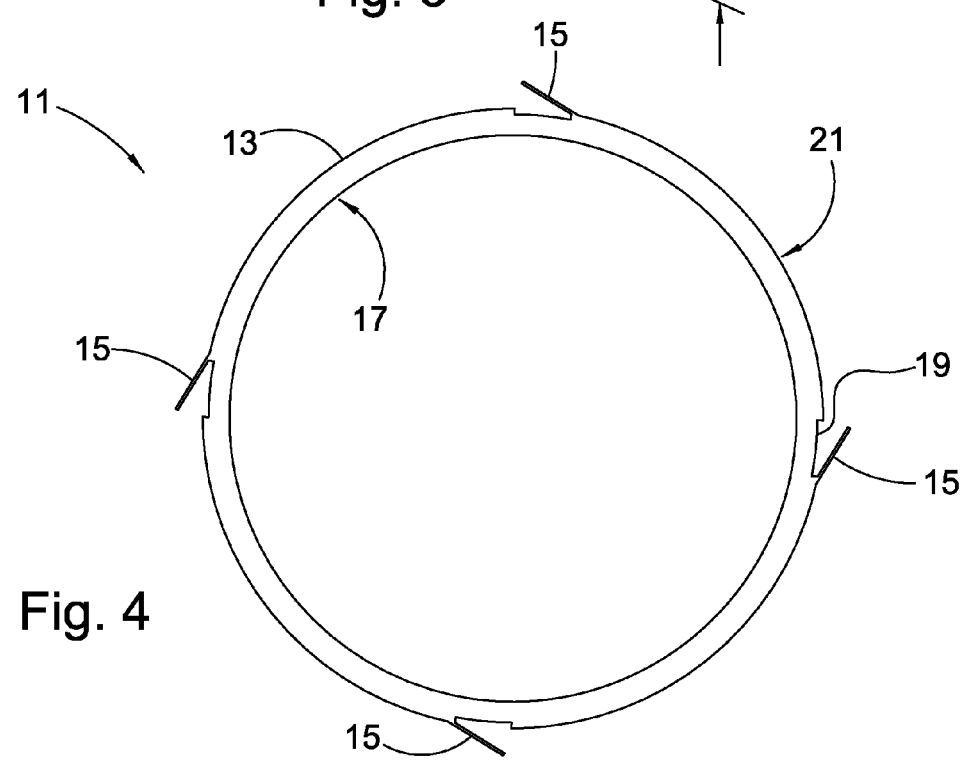
FIG. 4 is a front view of a second embodiment of a centered floating seal according to the current invention, having tabs about an outer diameter.

A second exemplary embodiment of the current invention is shown in FIG. 4. In this embodiment, centered floating seal 11 generally resembles floating seal 10, except that floating seal 11 includes tabs about its outer, not inner, diameter. Specifically, floating seal 11 includes substantially annular ring 13 which includes tabs 15 about outer diameter 21. Like floating seal 10, seats 19 are also included adjacent each tab for the same general purpose discussed above with respect to seats 18, namely, to receive the tabs if the tabs are flexed toward the ring. It should appreciated that seal 11 is arranged to be installed in a groove in an outer gland component, so that tabs 15 create a radial gap between the outer gland component and outer diameter 21, while inner diameter 17 defines the sealing surface which is engaged against an inner gland component for making a sealed, fully dynamic interface. Floating seal 11 may also include notches (not shown) similar to notches 20 to facilitate flexing of tabs 15. In general, any discussion concerning seal 10 or elements of seal 10 are also applicable to seal 11 or the corresponding elements of seal 11.

Figure 5:
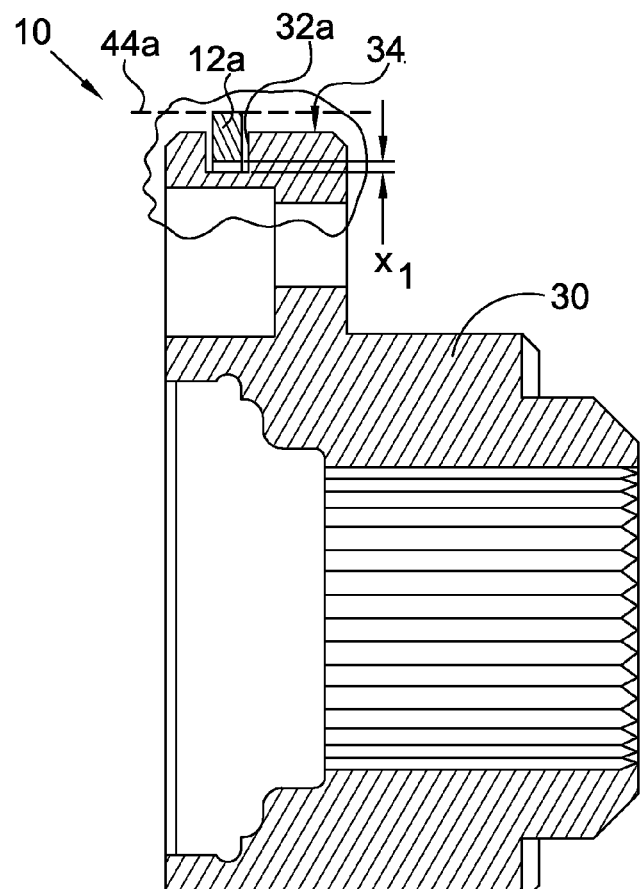
FIG. 5 is a cross-sectional view of the current invention centered floating seal installed on a hub.
Figure 6:
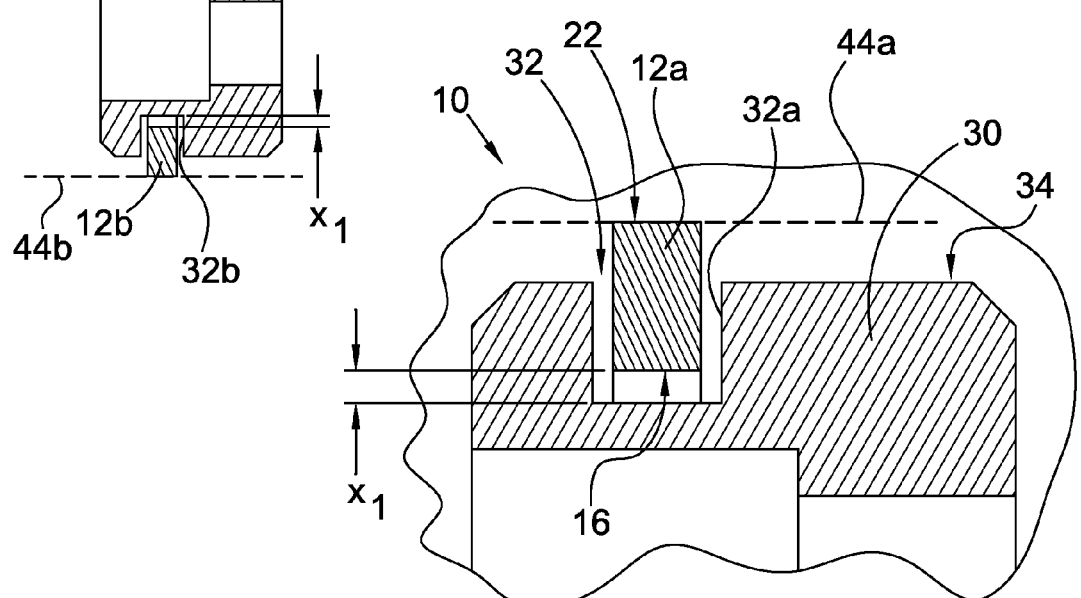
FIG. 6 is an enlarged view of the area generally encircled in FIG. 5.

One particular example of seal 10 installed in a gland is shown in FIGS. 5 and 6. In the shown example, seal 10 is installed in turbine hub 30 of a torque converter (not shown), to be pressed into a bore of a piston plate, which piston plate's inner diameter or surface is generally represented by dashed lines 44a and 44b, where the distance between the dashed lines generally representing the diameter of the bore of the piston plate, for example. Since the tabs center seal 10, there is no risk of outer diameter 34 of the hub and inner diameter 44a/44b of a piston plate shearing, pinching, or cutting a portion of the seal. It should be appreciated that the shown embodiment is only one particular example of the many potential applications of the current invention, which can be used to seal a fully dynamic interface between any two independently moveable components.

In FIGS. 5 and 6, seal 10 is included in groove 32 of hub 30. Ring 12 and groove 32 are designated with the identifiers "a" and "b" to differentiate their respective top and bottom portions, despite both being continuous annular elements. Thus, it can be seen that tabs 14 enable ring top portion 12a and ring bottom portion 12b to both sit radial distance $x_1$ from the base of groove top and bottom portions 32a and 32b, respectively.

Figure 7:
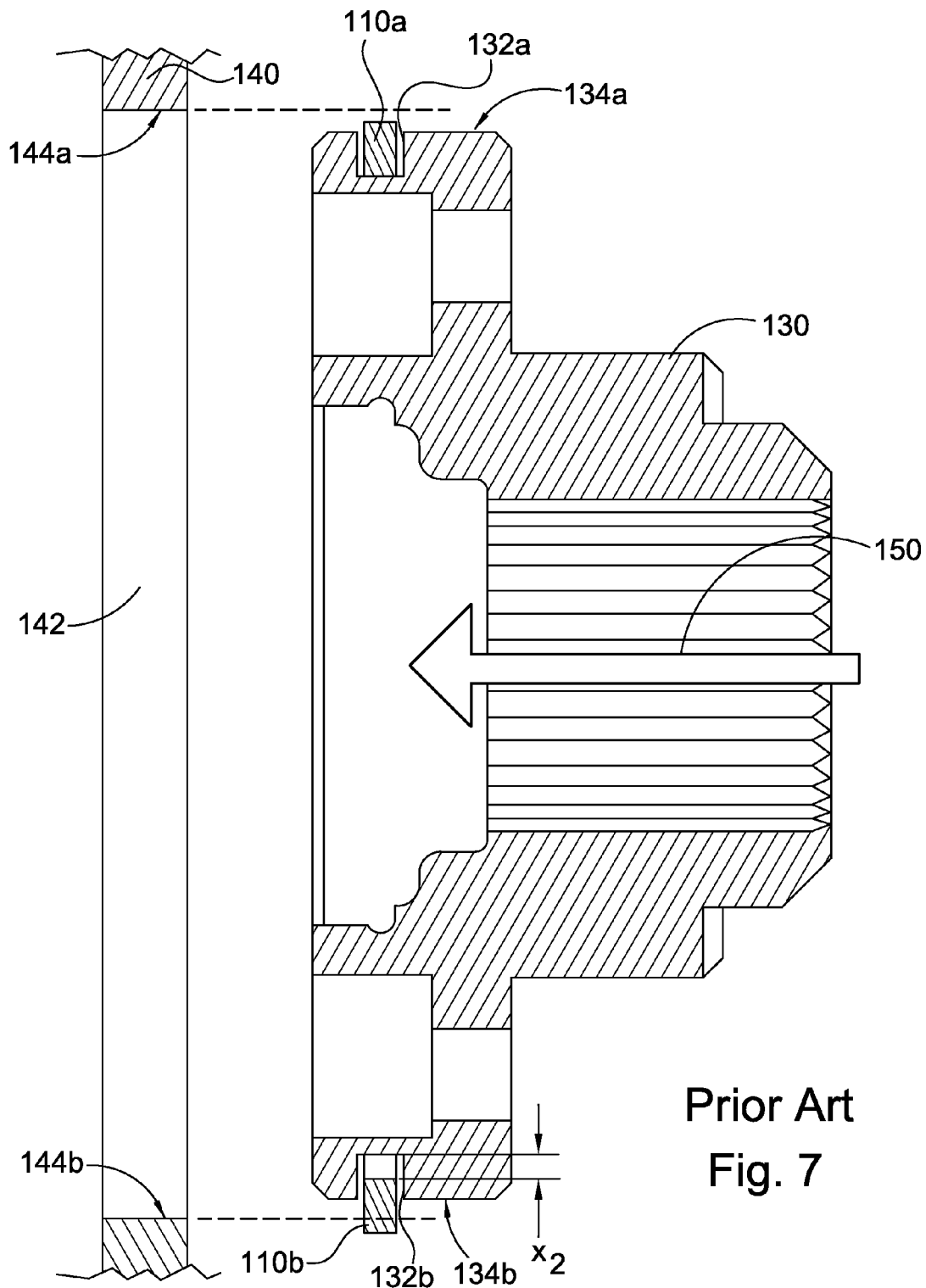
FIG. 7 is a perspective view of a prior art floating seal installed in a gland, which floating seal is radially falling due to gravity.

Unlike the prior art shown in FIG. 7, tabs 14 of floating seal 10 provide self-centering of the seal, so that the seal will not be cut or sheared between an inner diameter of an outer gland component, such as diameter 144 of piston plate 140 or inner diameter 44a/44b, and the outer diameter of an inner gland component, such as diameter 134 of hub 130 or diameter 34 of hub 30. It can be seen in FIG. 7 that prior art floating seals will fall or sag, so that there is no radial gap between the inner diameter of the ring and the base of the groove at the top of the inner gland component, but that there is a large radial gap between the groove and the seal at the bottom of the inner gland component. Specifically, the large radial gap between the groove and prior art seal 110 equals distance $x_2$, where distance $x_2$ is approximately equal to twice distance $x_1$, assuming seal 110 and ring 12 are similarly sized.

In one embodiment, seals 10 are formed by extruding a long cylindrical sleeve having a constant cross-section, then cutting the sleeve into rings to form each seal. The tabs may be extruded with the sleeve, machined into the sleeve after the extrusion, or machined into each individual cut ring. Although the tabs are shown as essentially cantilevered projections, it should be understood that other shapes and sizes of tabs are also within the scope and spirit of the current invention. The seal is preferably made from a material having a low coefficient of friction, such as polytetrafluoroethylene, to ensure the mobility of the gland components is not compromised by the seal.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A self-centering floating seal comprising:
   a substantially annular ring having a first diameter and a second diameter, wherein said ring is operatively arranged to be installed between a first gland component and a second gland component;
   a plurality of tabs protruding from said first diameter of said ring, wherein during assembly of said first gland component with said second gland component, said tabs are operatively arranged to exert a force on said first gland component to create a radial gap between said first diameter of said ring and said first gland component, while said second diameter is operatively arranged to engage against said second gland component for forming a sealed interface;
   a plurality of seats corresponding to said plurality of tabs, wherein each seat forms a recess in said first diameter of said ring for receiving one of said tabs when each tab is flexed toward said ring; and,
   wherein:
   said tabs are substantially equally spaced about said first diameter of said ring, and each of said tabs spans an axial thickness of said ring and has a first length measured from the first diameter;
   each of said recesses spans the axial thickness of said ring and has a second length in a circumferential direction; and,
   the first length is no greater than the second length.

2. The self-centering floating seal recited in claim 1, wherein said first diameter is an inner diameter of said ring and said second diameter is an outer diameter of said ring.

3. The self-centering floating seal recited in claim 1, wherein said first diameter is an outer diameter of said ring and said second diameter is an inner diameter of said ring.

4. The self-centering floating seal recited in claim 1, wherein the annular ring is formed of a single material.

5. The self-centering floating seal recited in claim 1, wherein the annular ring is formed of a monolithic piece.

6. The self-centering floating seal recited in claim 1, further comprising a notch in said ring, wherein said notch is located proximate an intersection of said tab with said ring, wherein said notch is operatively arranged to facilitate flexing of said tab.

7. A sealed fully dynamic interface comprising:
   an inner gland component;
   an outer gland component; and,
   a self-centering floating seal according to claim 1, wherein said self-centering floating seal is installed in a groove between said inner and outer gland components.

8. The sealed fully dynamic interface recited in claim 7, wherein said inner gland component comprises said groove, wherein said groove is located about an outer surface of said inner gland component, said first diameter is an inner diameter of said ring, and said second diameter is an outer diameter of said ring; and,
   wherein said tab is operatively arranged to engage against said inner gland component for creating said radial gap between said first diameter of said ring and said inner gland component, and wherein said second diameter of said ring is operatively arranged to engage against said outer gland component for forming said sealed interface.

9. The sealed fully dynamic interface recited in claim 7, wherein said outer gland component comprises said groove about an inner surface of said outer gland component, said first diameter is an outer diameter of said ring, and said second diameter is an inner diameter of said ring; and, wherein said tab is operatively arranged to engage against said outer gland component for creating said radial gap between said first diameter of said ring and said outer gland component, and wherein said second surface of said ring is operatively arranged to engage against said inner gland component for forming said sealed interface.

10. The sealed fully dynamic interface recited in claim 7, wherein said outer gland component is a piston plate and said inner gland component is a turbine hub.

11. The sealed fully dynamic interface recited in claim 7, wherein said plurality of tabs comprises exactly four tabs, wherein said tab is one of said exactly four tabs, and wherein said exactly four tabs are equally spaced about said first diameter of said ring and arranged in oppositely disposed pairs.

12. The self-centering floating seal recited in claim 1, wherein said plurality of tabs comprises exactly four tabs equally spaced about said first diameter of said ring and arranged in oppositely disposed pairs.

* * * * *